(12) United States Patent
Shin et al.

(10) Patent No.: US 12,059,805 B2
(45) Date of Patent: Aug. 13, 2024

(54) LAYER JAMMING DRIVING DEVICE

(71) Applicant: CHUNGANG UNIVERSITY INDUSTRY-ACADEMIC COOPERATION FOUNDATION, Seoul (KR)

(72) Inventors: Dong Jun Shin, Seoul (KR); Won Ho Choi, Daegu (KR)

(73) Assignee: CHUNGANG UNIVERSITY INDUSTRY-ACADEMIC COOPERATION FOUNDATION, Seoul (KR)

(*) Notice: Subject to any disclaimer, the term of this patent is extended or adjusted under 35 U.S.C. 154(b) by 618 days.

(21) Appl. No.: 17/287,863

(22) PCT Filed: Jun. 28, 2019

(86) PCT No.: PCT/KR2019/007852
§ 371 (c)(1),
(2) Date: Apr. 22, 2021

(87) PCT Pub. No.: WO2020/085611
PCT Pub. Date: Apr. 30, 2020

(65) Prior Publication Data
US 2021/0379754 A1 Dec. 9, 2021

(30) Foreign Application Priority Data

Oct. 26, 2018 (KR) .......................... 10-2018-0129173

(51) Int. Cl.
*F16D 121/14* (2012.01)
*A61H 3/00* (2006.01)
(Continued)

(52) U.S. Cl.
CPC .............. *B25J 9/1075* (2013.01); *A61H 3/00* (2013.01); *B25J 9/0006* (2013.01);
(Continued)

(58) Field of Classification Search
CPC .......... B25J 9/1075; B25J 9/0006; A61H 3/00
See application file for complete search history.

(56) References Cited

U.S. PATENT DOCUMENTS 10,013,062 B1    7/2018  Corson et al.
2012/0310126 A1* 12/2012  Bureau ............... A61F 5/05833
                                              602/6

(Continued)

FOREIGN PATENT DOCUMENTS

KR  10-2015-0112591 A    10/2015
WO     2017-120314 A1     7/2017
WO  WO-2020003175 A1 *    1/2020 ............. B32B 27/08

OTHER PUBLICATIONS

Kim et al., "A Novel Layer Jamming Mechanism With Tunable Stiffness Capability for Minimally Invasive Surgery", Aug. 2013, IEEE, vol. 29, No. 4, pp. 1031-1042. (Year: 2013).*

(Continued)

*Primary Examiner* — Bobby Rushing, Jr.
(74) *Attorney, Agent, or Firm* — NKL LAW; Jae Youn Kim

(57) ABSTRACT

A layer jamming driving device is proposed, which includes an enclosure made of a variable material; and layer stacked structures having a plurality of layers stacked inside the enclosure, wherein the layer stacked structures can be coupled so as to be slidable and rotatable with respect to each other.

12 Claims, 8 Drawing Sheets

(51) Int. Cl.
*B25J 9/00* (2006.01)
*B25J 9/10* (2006.01)
*B25J 19/00* (2006.01)
*F16D 59/00* (2006.01)

(52) U.S. Cl.
CPC .......... *B25J 19/0075* (2013.01); *F16D 59/00* (2013.01); *A61H 2201/165* (2013.01); *A61H 2201/1659* (2013.01); *F16D 2121/14* (2013.01)

(56) References Cited

U.S. PATENT DOCUMENTS

| | | |
|---|---|---|
| 2017/0185152 A1 | 6/2017 | Keller et al. |
| 2017/0360589 A1* | 12/2017 | Corrigan ................ F16M 13/00 |
| 2018/0368664 A1* | 12/2018 | Nagda ................ A61B 1/00135 |
| 2022/0316556 A1* | 10/2022 | Corrigan ................ F16G 13/08 |

OTHER PUBLICATIONS

Choi et al., "A Soft, Controllable, High Force Density Linear Brake Utilizing Layer Jamming", IEEE Robotics and Automation Letters, Oct. 11, 2017, pp. 1-8, vol. 3. Issue 1.

* cited by examiner

LAYER JAMMING DRIVING DEVICE

TECHNICAL FIELD

The present invention relates to a layer jamming driving device, and more particularly, to a layer jamming driving device for implementing variable rigidity of a wearable robot.

BACKGROUND ART

Currently, jamming driving devices are mostly used to implement variable rigidity of soft wearable robots. The jamming driving device implements the variable rigidity by embedding various materials such as particles and layers therein. Among these jamming driving devices, a layer jamming driving device has advantages in that the device can be manufactured to be thin and high rigidity can be realized in a linear tension direction.

However, the existing layer jamming driving device has been made so that the rigidity is increased only in the linear tension direction. Due to this structural feature, the layer jamming driving device has a problem in that is difficult to use when severe bending occurs or when a tensile direction is not the linear direction. As a result, a motion in a direction parallel to a layer is limited in a state where no vacuum is applied, and thus, the layer jamming driving device is not suitable for a soft wearable robot that is worn on a body with many curves.

In addition, when an external flexible enclosure is excessively stretched, the layer may fall out. In this case, since an inside of the layer jamming driving device is sealed, the layer that has fallen out is difficult to arrange at an original position thereof again, which decreases performance of the layer jamming driving device.

DISCLOSURE

Technical Problem

The present invention is directed to providing a layer jamming driving device having a structure applicable to a body of a person having various curves and capable of implementing an effective variable rigidity mechanism for a wearable robot requiring multiple degrees of freedom.

Technical Solution

One aspect of the present invention provides a layer jamming driving device including an enclosure made of a variable material and layer stacked structures including a plurality of layers stacked inside the enclosure, in which the layer stacked structures are slidably and rotatably coupled to each other.

A sliding slot may be formed at a center of each layer in a longitudinal direction.

The layer stacked structures adjacent to each other may be rotatably coupled to each other by a shaft pin passing through the sliding slot.

Holders for fixing ends of the layer stacked structures may be provided at both ends of the enclosure, and fixed ends may be formed to extend at a center height from surfaces of the holder facing each other so that the layer stacked structures are fixed to upper and lower surfaces of the fixed ends.

Holders for fixing ends of the layer stacked structures may be provided at both ends of the enclosure, and support layer stacked structures for fixing the layer stacked structures to the holder may be coupled to both ends of the layer stacked structures.

Each support layer stacked structure may have a stacked structure including a plurality of support layers, and the layer stacked structures may be slidably and rotatably coupled to the support layer stacked structures.

Both ends of the layer may be formed to be round.

A rotation protrusion inclined in a rotation direction may protrude from a surface of at least one end of the layer.

A linear or curved pattern surface may be formed on a surface of the layer.

A bending groove may be formed on an outer surface of the enclosure so that the enclosure is easily transformed.

The bending groove may be formed adjacent to a coupling portion between the layer stacked structures.

A coupling portion between the layer stacked structures in the enclosure may be formed to be thinner than other portions.

In the layer stacked structures, two or more layer stacked structures may be coupled in parallel at an end of any one layer stacked structure.

Another aspect of the present invention provides a wearable robot to which the layer jamming driving device according to one embodiment of the present invention is applied.

Advantageous Effects

According to one embodiment of the present invention, it is possible to implement a variable rigidity mechanism effective for a wearable robot having a structure applicable to a body of a person having various curves and requiring multiple degrees of freedom.

MODES OF THE INVENTION

In the present invention, various transformations may be applied and various embodiments may be provided, and specific embodiments will be illustrated in the accompanying drawings and described in detail. However, this is not intended to limit the present invention to a specific embodiment, and it should be understood to include all conversions, equivalents, and substitutes included in the spirit and scope of the present invention. In describing the present invention, when it is determined that a detailed description of a related known technology may obscure a subject matter of the present invention, a detailed description thereof will be omitted.

Terms such as first and second may be used to describe various components, but the components should not be limited by the terms. The above terms are used only for the purpose of distinguishing one component from another component.

Terms used in the present application are only used to describe specific embodiments and are not intended to limit the present invention. Singular expressions include plural expressions unless the context clearly indicates otherwise. In the present application, terms such as "include" or "have" are intended to designate the presence of features, numbers, steps, actions, components, parts, or combinations thereof described in the specification, and it is to be understood that the terms do not preclude the possibility of the presence or addition of one or more other features or numbers, steps, actions, components, parts, or combinations thereof.

Hereinafter, a layer jamming driving device according to embodiments of the present invention will be described in detail with reference to the accompanying drawings, and in descriptions with reference to the accompanying drawings, the same or corresponding components are assigned the same reference numbers, and repeated descriptions will be omitted.

Figure 1:
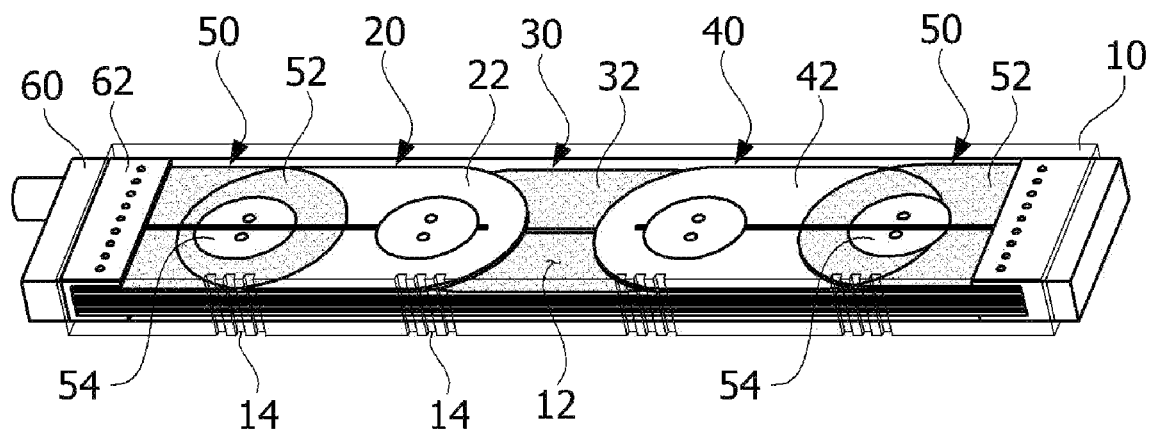
FIG. 1 is a perspective view of a layer jamming driving device according to one embodiment of the present invention.
Figure 2:
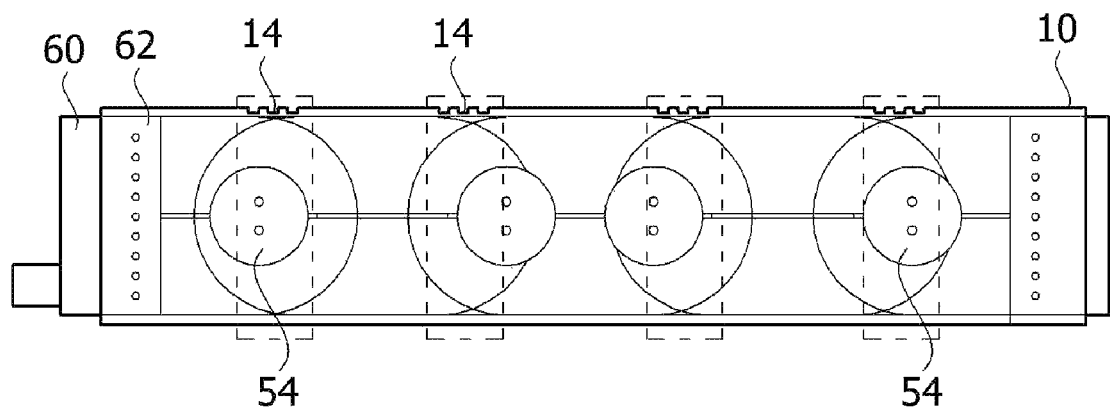
FIG. 2 is a plan view of the layer jamming driving device according to one embodiment of the present invention.

FIG. 1 is a perspective view of a layer jamming driving device according to one embodiment of the present invention, and FIG. 2 is a plan view of the layer jamming driving device according to one embodiment of the present invention.

As illustrated, the layer jamming driving device includes an enclosure 10 made of a variable material and layer stacked structures 20, 30, and 40 having a plurality of layers 22, 32, and 42 stacked inside the enclosure 10, in which the layer stacked structures 20, 30, and 40 may be coupled slidably and rotatably to each other.

The enclosure 10 is a part that forms an exterior of the layer jamming driving device and has a flat rectangular parallelepiped shape elongated in one direction. An accommodation space 12 in which the layer stacked structures 20, 30, and 40 are accommodated is formed inside the enclosure 10, and the enclosure 10 is made of a variable material such as silicone to perform jamming driving in a state where the layer stacked structures 20, 30, and 40 are accommodated in the enclosure 10. For reference, in order to illustrate an internal structure of the layer jamming driving device, the enclosure 10 is illustrated as a transparent material in the drawings, but the enclosure 10 may be made of an opaque material.

In the present embodiment, three layer stacked structures 20, 30, and 40 are provided. However, this is only presented as an embodiment containing a technical idea of the present invention, and four or more layer stacked structures 20, 30, and 40 may be connected to each other and driven.

Meanwhile, a bending groove 14 may be formed in an outer surface of the enclosure 10 so that the enclosure 10 can be easily transformed. As illustrated in the drawings, a plurality of bending grooves 14 may be formed at regular intervals. Preferably, the bending grooves 14 are formed adjacent to coupling portions between the layer stacked structures 20, 30, and 40, as illustrated by dotted lines in FIG. 2. In this way, the bending grooves 14 are formed, and thus, when variable driving with multiple degrees of freedom mainly occurs in the coupling portions between the layer stacked structures 20, 30, and 40, the enclosure 10 is more smoothly transformed.

In addition, the coupling portions between the layer stacked structures 20, 30, and 40 in the enclosure 10 may be formed to be thinner than other portions so that the enclosure 10 may be transformed well.

In the drawings, support layer stacked structures 50 for fixing the layer stacked structures 20, 30, and 40 to holders 60 may be coupled to both ends of the layer stacked structures 20, 30, and 40. The support layer stacked structures 50 may also be coupled slidably and rotatably to the layer stacked structures 20, 30, and 40, and have a stacked structure including a plurality of support layers 52.

Figure 3:
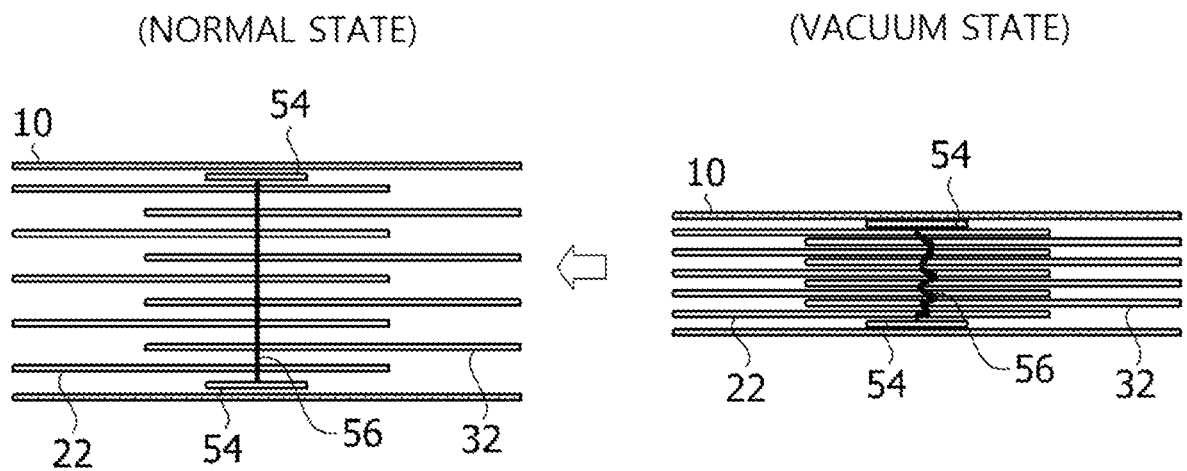
FIG. 3 is a view illustrating a connection structure of a layer stacked structure of the present invention.
Figure 4:
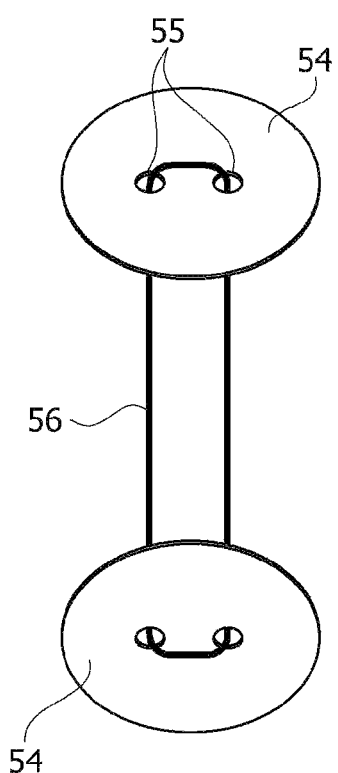
FIG. 4 is a view illustrating a connection layer and a string of the present invention.

Referring to FIGS. 3 and 4, adjacent first and second layers 22 and 32 may be coupled slidably and rotatably to each other by connection layers 54. The connection layer 54 may be formed in a disk shape that is smaller than the first layer 22 and the second layer 32, and a pair of connection layers 54 may be provided on upper and lower surfaces of the first layer 22 and the second layer 32 and connected to each other by a string 56. The string 56 may be formed of a material such as thread or string, and the string 56 may connect the pair of connection layers 54 through the connection holes 55, which are formed in parallel, in the connection layers 54. The above-described shape of the connection layer 54 is merely an example, and the connection layer 54 may be made in any shape such as a square shape or a triangular shape instead of a circular shape.

In the case of the connection layers 54 being connected to each other by the string 56 having a certain length, even when a state is switched from a normal state to a vacuum state and the connection layer 54 between the layers 22 and 32 is pressed, the enclosure 10 does not interfere with compressing the layers 22 and 32, and thus, the jamming driving device can be smoothly driven.

Referring to FIGS. 5A-5C and 6A-B, the layer stacked structures 20, 30, and 40 may include a first layer stacked structure 20, a second layer stacked structure 30, and a third layer stacked structure which are coupled slidably and rotatably to each other. In order to slidably and rotatably couple the layer stacked structures 20, 30, and 40 to each other as described above, an example of the following configuration is presented.

First, each of the layer stacked structures 20, 30, and 40 is formed by laminating the plurality of layers 22, 32, and 42 in a vertical direction, and ends of adjacent layers 22, 32, and 42 are alternately stacked between the stacked layers 22, 32, and 42.

In addition, sliding slots 24, 34 and 44 are formed in a longitudinal direction at a center of each of the layers 22, 32 and 42. Moreover, the layers 22, 32, and 42 are rotatably coupled to each other by shaft pins P passing through the sliding slots 24, 34, and 44. The shaft pin P allows the layers 22, 32, and 42 to slide and rotate while moving on the sliding slots 24, 34, and 44 due to a user's motion.

Figure 5A:
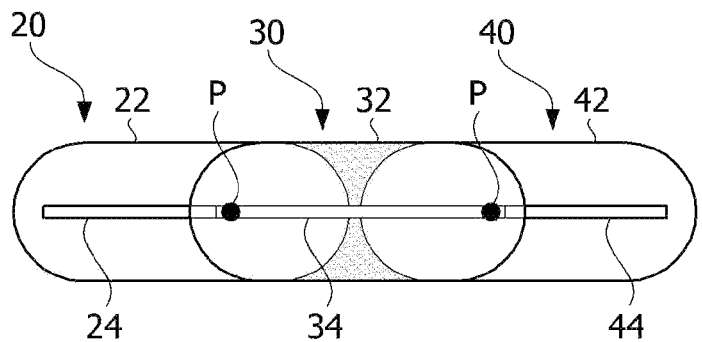
FIGS. 5A-5C are views illustrating various driving examples of the layer stacked structure of the present invention.

FIG. 5A illustrates a state where the layer stacked structures 20, 30, and 40 are contracted in the longitudinal direction. That is, while the shaft pins P move in the longitudinal direction along the sliding slots 24, 34, and 44, all of the layer stacked structures 20, 30, and 40 may be driven to contract in the longitudinal direction.

Figure 5B:
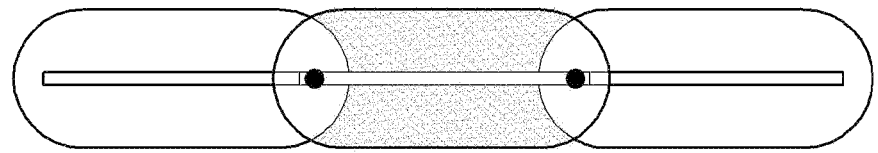

FIG. 5B illustrates a state where the layer stacked structures 20, 30, and 40 extend with respect to each other in the longitudinal direction. That is, while the shaft pins P move in the longitudinal direction along the sliding slots 24, 34, and 44, all of the layer stacked structures 20, 30, and 40 may be driven to expand in the longitudinal direction.

Figure 5C:
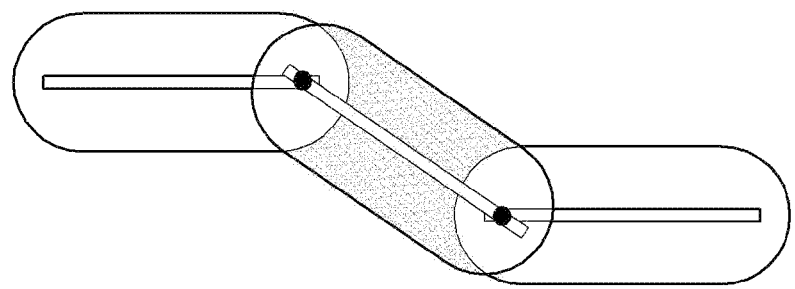
Figure 6A:
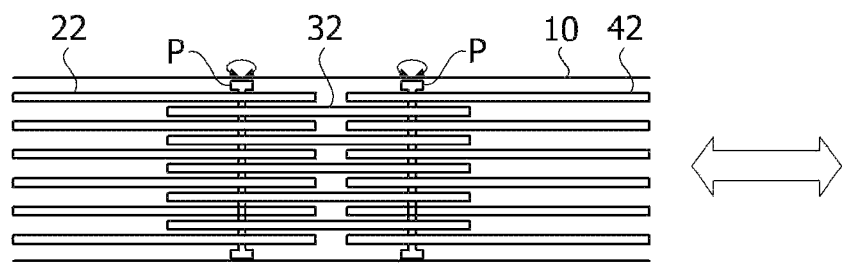
FIGS. 6A-6B are views illustrating another connection structure of the layer stacked structure of the present invention.
Figure 6B:
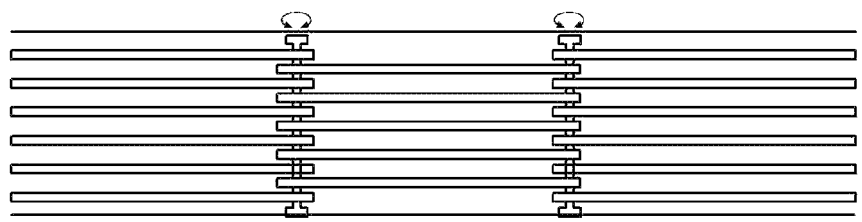

FIG. 5C illustrates a state where the first layer stacked structure 20 and the second layer stacked structure 30 rotate with respect to each other and the second layer stacked structure 30 and the third layer stacked structure 40 rotate with respect to each other. That is, the layer stacked structures 20, 30, and 40 rotate with respect to each other about the shaft pin P and are driven at a free angle, and thus, variable driving with multiple degrees of freedom thereof may be realized. In the case of the existing layer jamming driving device, variable driving with about one or two degrees of freedom may be performed. However, when a sliding linkage mechanism through the coupling structure of the layer stacked structures 20, 30, and 40 described above is used, the layer jamming driving device may be driven much more freely than the existing layer jamming driving device.

Figure 7:
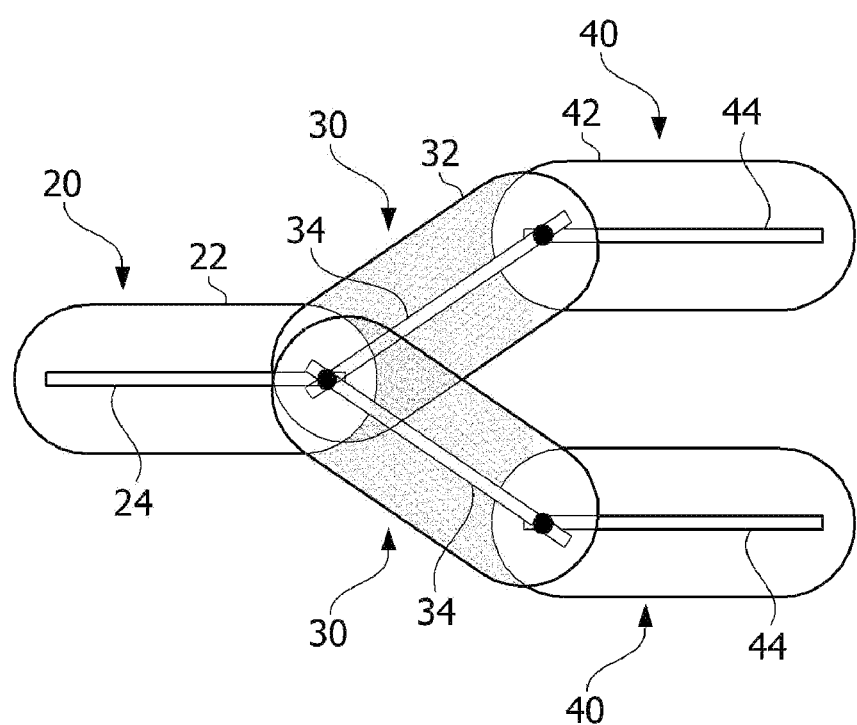
FIG. 7 is a view illustrating a Y-shaped coupling structure of the layer stacked structure of the present invention.

Referring to FIG. 7, two second layer stacked structures 30 coupled to the first layer stacked structure 20 may be configured in parallel. That is, the two second layer stacked structures 30 may be rotated with respect to each other in symmetrical directions at the end of the first layer stacked structure 20, and two third layer stacked structures 40 may be each coupled to one of the ends of the second layer stacked structures 30. In this way, all of the layer stacked structures 20, 30, and 40 have a Y shape, and thus, the layer stacked structures 20, 30, and 40 may be suitably used for similar joints of a wearable robot. An example of the Y-shape structure illustrated in FIG. 7 is only presented, and the layer stacked structures 20, 30, and 40 may be manufactured in various shapes such as an H shape, a T shape, and a S shape.

Figure 8:
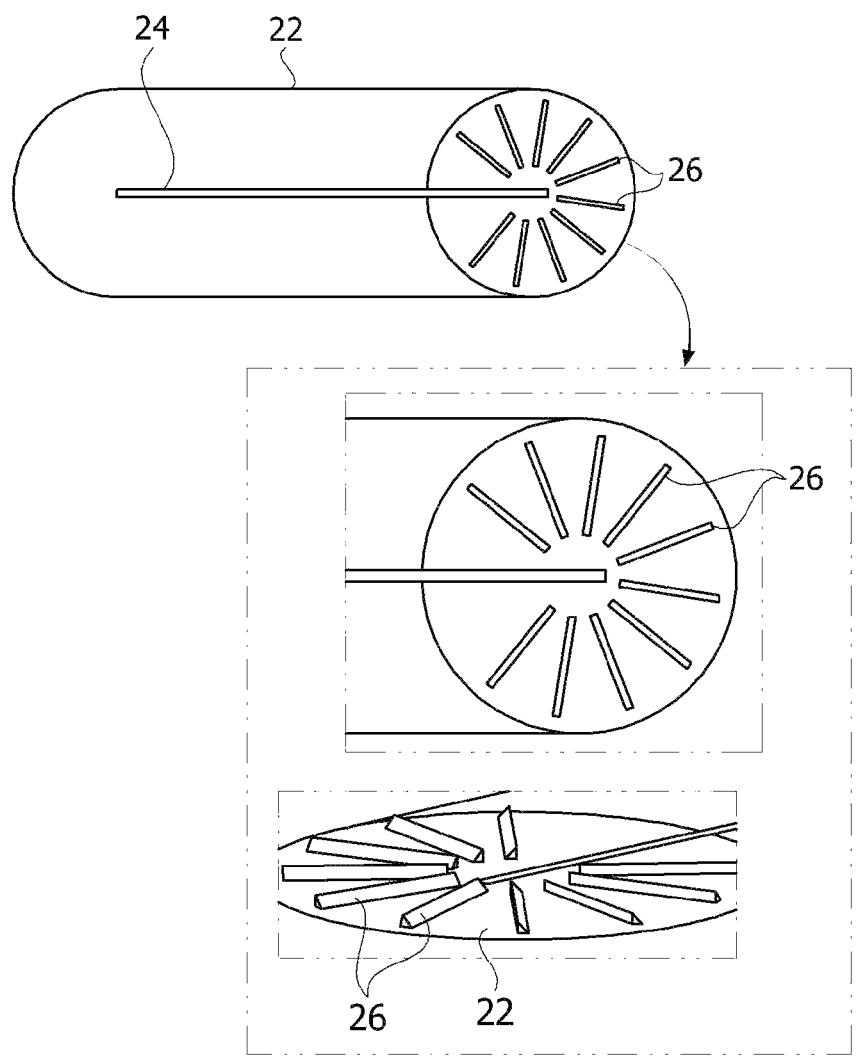
FIG. 8 is a view illustrating rotational protrusions formed on a surface of the layer of the present invention.

Referring to FIG. 8, the first layer 22 may have both ends formed to be round. This is to facilitate rotational operations between the layers 22, 32, and 42 that are rotatably coupled to each other. In addition, a first rotational protrusion 26 inclined in a rotation direction may protrude from a surface of at least one end of the first layer 22. A plurality of first rotational protrusions 26 may be provided at regular intervals in a circumferential direction. This is to implement a mechanism in which, in the coupling between the first layer 22 and the second layer 32, the first layer 22 and the second layer 32 are rotated only in one direction and are constrained in a direction opposite to the one direction.

In FIG. 8, an example of the first layer 22 is described. However, the first rotational protrusions 26 may be also provided in at least one end of each of the second layer 32 and the third layer 42.

Figure 9:
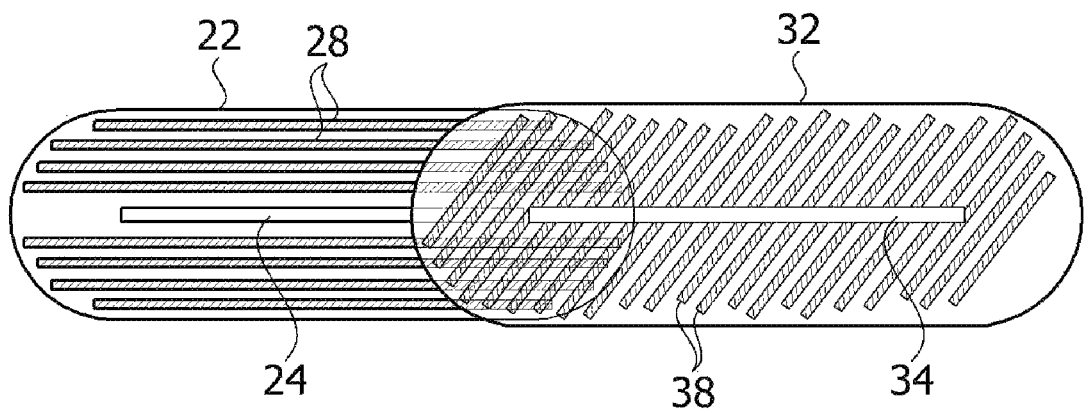
FIG. 9 is a view illustrating a pattern surface formed on the surface of the layer of the present invention.

Referring to FIG. 9, a plurality of linear or curved first pattern surfaces 28 and second pattern surfaces 38 may be formed on surfaces of the first layer 22 and the second layer 32. The first pattern surface 28 and the second pattern surface 38 are formed to maximize rigidity at a specific angle, and in FIG. 9, the curved first pattern surface 28 and second pattern surface 38 as well as the linear first pattern surface 28 and second pattern surface 38 may be formed. That is, when the first pattern surface 28 and the second pattern surface 38 are formed in parallel at a specific angle, when the first layer 22 and the second layer 32 are rotated at a specific angle, a binding force is increased and the rigidity may be maximized.

Similarly, in FIG. 9, the examples of the first layer 22 and the second layer 32 are described. However, a third pattern surface 48 corresponding to the first pattern surface 28 and the second pattern surface 38 may be also formed on a surface of the third layer 42.

In the above, the pattern surfaces 28 and 38 are described with reference to the drawings but are not limited thereto. That is, the pattern surfaces 28 and 38 may be formed in any shape such as an embossed shape or an engraved shape.

Figure 10A:
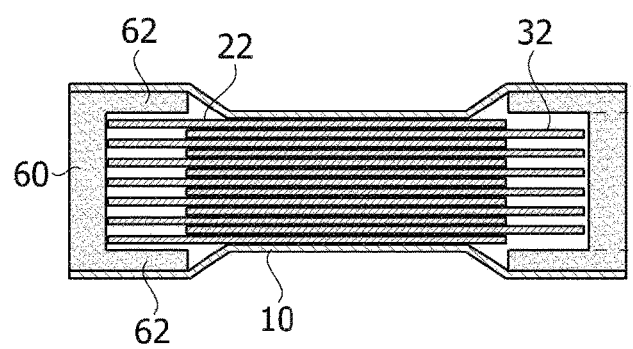
FIGS. 10A-10B are views illustrating various embodiments of a holder of the present invention.

Referring to FIG. 10A, holders 60 for fixing the ends of the layer stacked structures 20, 30 and 40 are each provided at one of the both ends of the enclosure 10. Each holder 60 includes fixed ends 62 extending toward the layer stacked structures 20, 30, and 40. In this case, the fixed ends 62 may extend in parallel from an upper end and a lower end of surfaces facing each other of the holder 60. However, in the case where the holder 60 is provided in this way, the holder 60 has a c shape when viewed from a side and the fixing end 62 has a thickness. Accordingly, there may be a disadvantage in that an entire thickness of the enclosure 10 should be increased and the enclosure 10 should be bent at the upper and lower surfaces of the layers 22 and 32.

Figure 10B:
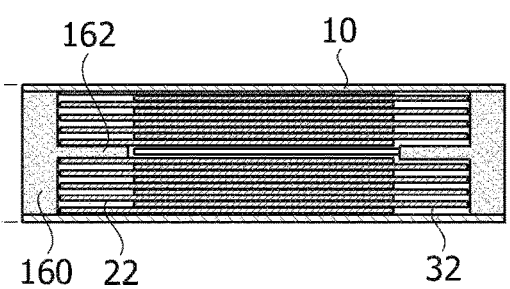

Accordingly, in the present embodiment, as illustrated in FIG. 10B, a fixed end 162 at a central height is formed to extend from surfaces of a holder 160 facing each other. In this case, since the ends of the first layer 22 and the second layer 32 may be fixed to upper and lower surfaces of the fixed end 162, respectively, there is an advantage in that the entire thickness of the enclosure 10 may be minimized.

Heretofore, the specific embodiments of the present invention are described. However, those of ordinary skill in the art will appreciate that various modifications and changes can be made to the present invention without departing from spirit and scope of the present invention described in the following claims.

The invention claimed is:

1. A layer jamming driving device comprising:
   an enclosure made of a variable material; and
   layer stacked structures including a plurality of layers stacked inside the enclosure,
   wherein the layer stacked structures are slidably and rotatably coupled to each other,
   wherein a sliding slot is formed at a center of each layer in a longitudinal direction, and
   wherein the layer stacked structures adjacent to each other are rotatably coupled to each other by a shaft pin passing through the sliding slot.

2. The layer jamming driving device of claim 1, wherein holders for fixing ends of the layer stacked structures are provided at both ends of the enclosure, and fixed ends are formed to extend at a center height from surfaces of the holder facing each other so that the layer stacked structures are fixed to upper and lower surfaces of the fixed ends.

3. The layer jamming driving device of claim 1, wherein holders for fixing ends of the layer stacked structures are provided at both ends of the enclosure, and
   support layer stacked structures for fixing the layer stacked structures to the holder are coupled to both ends of the layer stacked structures.

4. The layer jamming driving device of claim 3, wherein each support layer stacked structure has a stacked structure including a plurality of support layers, and
   the layer stacked structures are slidably and rotatably coupled to the support layer stacked structures.

5. The layer jamming driving device of claim 1, wherein both ends of each layer are formed to be round.

6. The layer jamming driving device of claim 1, wherein a linear or curved pattern surface is formed on a surface of each layer.

7. The layer jamming driving device of claim 1, wherein a coupling portion between the layer stacked structures in the enclosure is formed to be thinner than other portions.

8. The layer jamming driving device of claim 1, wherein in the layer stacked structures, two or more layer stacked structures are coupled in parallel at an end of any one layer stacked structure.

9. A wearable robot to which the layer jamming driving device of claim 1 is applied.

10. A layer jamming driving device comprising:
   an enclosure made of a variable material; and
   layer stacked structures including a plurality of layers stacked inside the enclosure,
   wherein the layer stacked structures are slidably and rotatably coupled to each other, and
   wherein a rotation protrusion inclined in a rotation direction protrudes from a surface of at least one end of each layer.

11. A layer jamming driving device comprising:
   an enclosure made of a variable material; and
   layer stacked structures including a plurality of layers stacked inside the enclosure,
   wherein the layer stacked structures are slidably and rotatably coupled to each other, and
   wherein a bending groove is formed in an outer surface of the enclosure so that the enclosure is easily transformed.

12. The layer jamming driving device of claim 11, wherein the bending groove is formed adjacent to a coupling portion between the layer stacked structures.

\* \* \* \* \*